US009744903B2

(12) United States Patent
Malone et al.

(10) Patent No.: US 9,744,903 B2
(45) Date of Patent: Aug. 29, 2017

(54) URGENT VEHICLE WARNING INDICATOR USING VEHICLE ILLUMINATION

(71) Applicant: FORD GLOBAL TECHNOLOGIES, LLC, Dearborn, MI (US)

(72) Inventors: Mark D. Malone, Canton, MI (US); William N. Mansur, West Bloomfield, MI (US); Tuan A. Be, Livonia, MI (US); John R. Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/469,106

(22) Filed: Aug. 26, 2014

(65) Prior Publication Data
US 2016/0059777 A1 Mar. 3, 2016

(51) Int. Cl.
*B60R 25/10* (2013.01)
*B60Q 1/50* (2006.01)
*B60K 35/00* (2006.01)
*B60Q 1/52* (2006.01)
*B60Q 9/00* (2006.01)
*B60Q 3/80* (2017.01)
*B60Q 3/78* (2017.01)

(52) U.S. Cl.
CPC ............... *B60Q 1/50* (2013.01); *B60K 35/00* (2013.01); *B60Q 1/525* (2013.01); *B60Q 3/80* (2017.02); *B60Q 9/00* (2013.01); *B60Q 9/008* (2013.01); *B60Q 3/78* (2017.02)

(58) Field of Classification Search
CPC ........ B60Q 1/442; B60Q 1/525; B60Q 5/008; B60Q 1/50; B60Q 9/00; B60Q 9/008; B60Q 3/80; B60K 35/00
USPC ....... 340/815.4, 815.45, 435, 438, 461, 463, 340/468, 471, 944, 426.13, 340/426.22–426.24; 362/464, 487, 362/543–545
See application file for complete search history.

(56) References Cited

U.S. PATENT DOCUMENTS

| 4,556,862 A * | 12/1985 | Meinershagen | B60Q 1/26 340/466 |
| 5,307,048 A * | 4/1994 | Sonders | B60R 25/04 340/426.12 |
| 6,179,453 B1 | 1/2001 | McMahon | |
| 7,095,318 B1 * | 8/2006 | Bekhor | B60Q 1/503 340/464 |
| 7,164,350 B2 | 1/2007 | Ferrone et al. | |
| 7,365,638 B2 | 4/2008 | Eguchi | |
| 2004/0089491 A1 * | 5/2004 | Reuter | B60K 6/445 180/287 |

(Continued)

Primary Examiner — Thomas Mullen
(74) Attorney, Agent, or Firm — Frank MacKenzie; Brooks Kushman P.C.

(57) ABSTRACT

Exemplary methods, vehicles, and systems are disclosed. An exemplary method may include establishing at least one visible signal configured to provide a signal during a normal state of a vehicle, detecting an alarm state of the vehicle, and initiating a visible nuisance via the at least one visible signal in response to at least the detected alarm state. An exemplary vehicle may include at least one lighting device configured to provide a signal during a normal state of a vehicle, and a processor configured to detect an alarm state of the vehicle and initiate a visible nuisance via the at least one visible signal in response to at least the detected alarm state.

14 Claims, 11 Drawing Sheets

(56) References Cited

U.S. PATENT DOCUMENTS

| | | | |
|---|---|---|---|
| 2005/0146443 A1* | 7/2005 | Chen | B60Q 1/444 340/815.45 |
| 2011/0199199 A1* | 8/2011 | Perkins | B60Q 1/506 340/435 |
| 2012/0235568 A1 | 9/2012 | Prodin et al. | |
| 2012/0323439 A1* | 12/2012 | Inakazu | B60Q 5/008 701/36 |
| 2014/0049973 A1* | 2/2014 | Adachi | B60Q 1/085 362/465 |
| 2014/0191883 A1* | 7/2014 | Bolton | B60W 50/14 340/905 |
| 2014/0310739 A1* | 10/2014 | Ricci | G07C 9/00158 725/28 |

* cited by examiner

URGENT VEHICLE WARNING INDICATOR USING VEHICLE ILLUMINATION

BACKGROUND

Historically, motor vehicles have exhibited obvious tell-tales to operators and bystanders indicating that the vehicle is "on," or that various vehicle systems are otherwise active. For example, the operation of many internal combustion engines, especially older engines, are sufficiently loud and generally exhibit a sufficient degree of vibration during operation that their running is obvious to the driver, passengers, and anyone standing nearby.

Modern automotive vehicle systems are increasingly modifying traditional indicators that signal to vehicle operators and bystanders that a vehicle is running, that torque is being applied to vehicle wheels, that a vehicle is in gear, or that a vehicle's engine is even active. For example, modern internal combustion engines are relatively quiet and nearly free of vibration that can be perceived outside the vehicle. Moreover, the introduction of automated engine stop-start (S/S, AES, etc.) systems, hybrid powertrains, or battery electric vehicles (BEV) may make it more difficult for an operator or bystander to realize that a vehicle is active, running, in gear, or otherwise poses a potential danger to bystanders when in motion or during service.

Moreover, vehicles without a traditional ignition key that is turned in a cylinder pose the additional problem that it is not readily obvious to the driver or passengers that the vehicle's electrical power is still enabled, particularly when the audio system is off. Additionally, even if gear selection would otherwise indicate torque production, torque may not currently be produced, or there may be little to no indication in the traditional sense of motor/engine sound and feel. For example, some systems cancel torque equal to application of torque requestors minus torque inhibitors such that when canceled the vehicle may momentarily appear 'off' to operators familiar only with traditional systems.

Behaviors of vehicle systems can therefore be complex and go beyond the operator's ability to keep track of the vehicle's current motive state without specialized knowledge of these systems. In some cases knowledge of previous states may also be required to predict current states without proper examination of supporting vehicle displays and/or other available indicators.

Similar issues can exist for those who may be approaching such modern automotive systems external to the vehicle itself or those who may be servicing or contacting the vehicle. This same lack of indicators described above, also make it more difficult for such a person to know what to expect of the vehicle and/or its potential motive capability, or even whether it is currently enabled for use. Ignorance of these states can lead to increased risk and cause for uncertainty of theft, safety, depletion of power reserve, or other undesired results.

Many of the concerns described above are made more problematic upon operator exit of the vehicle, when the operator may be unaware or uncertain of the present vehicle state. Some systems today utilize tell-tales, message center indications, or audible alarms to attempt to warn the operator that exit of the vehicle may be undesirable given the present state of the vehicle which allows the operator to make an informed decision. However, some concern remains that either operators may be sufficiently distracted (e.g., not looking at the instrument cluster as they are in a rush, on a phone, interfacing with toll booths, parking lot ticket systems, etc.), handicapped (e.g., unable to hear audible alarms due to disability, or use of phone, radio, or headphones/earphones, etc.), or just confused as to the meaning of such indicators. Also, existing known mechanisms do little to nothing to warn those external to the vehicle that they may need to take note of the vehicle's present state.

Accordingly, there is a need for an improved method of alerting vehicle operators and bystanders of potential dangers associated with activated vehicle systems.

BRIEF SUMMARY

Various exemplary illustrations are provided of a method, which may include establishing at least one visible signal configured to provide a signal during a normal state of a vehicle, and detecting an alarm state of the vehicle. Exemplary methods may further include initiating a visible nuisance via the at least one visible signal in response to at least the detected alarm state.

In some exemplary approaches, a method may further include providing the visible nuisance such that it is visible from an exterior of the vehicle, establishing a group of normal vehicle notifications provided by the visible signal during the normal state of the vehicle, and establishing the visible nuisance as not included in the group of normal vehicle notifications. These exemplary methods may further include differentiating the visible nuisance from the group of normal vehicle notifications, including at least providing a perceptible difference in at least one of a brightness, a color, and a pattern of the visible nuisance compared with the group of normal vehicle notifications.

Exemplary illustrations are also provided of a vehicle comprising at least one lighting device configured to provide a signal during a normal state of a vehicle, and a processor configured to detect an alarm state of the vehicle and initiate a visible nuisance via the at least one visible signal in response to at least the detected alarm state.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Figure 1:
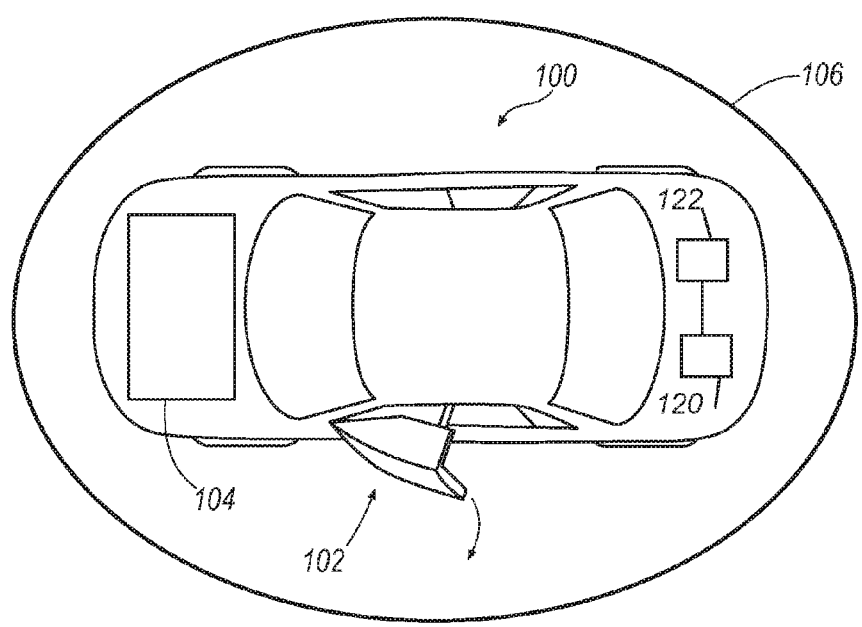
FIG. 1 is a schematic illustration of a vehicle having an urgent warning system, according to an exemplary illustration.

Referring now to the drawings, illustrative examples are shown in detail. Although the drawings represent the exemplary illustrations described herein, the drawings are not necessarily to scale and certain features may be exaggerated to better illustrate and explain an innovative aspect of an embodiment. Further, the examples described herein are not intended to be exhaustive or otherwise limit or restrict the scope of the present disclosure to the precise form and configuration shown in the drawings and disclosed in the following detailed description.

Figure 3:
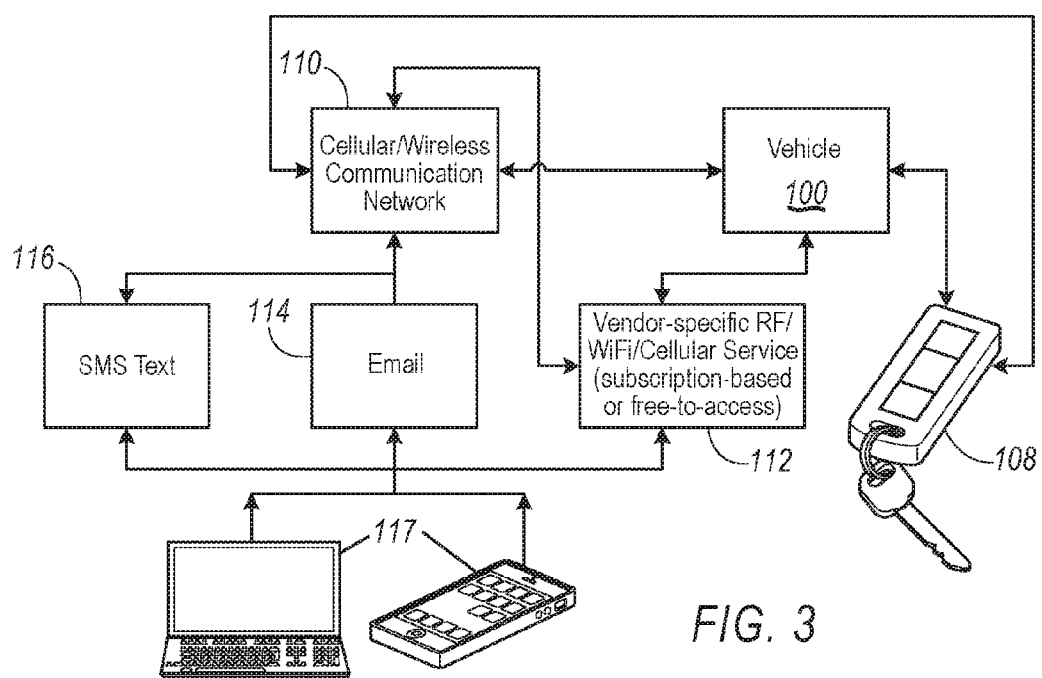
FIG. 3 is a schematic illustration of an exemplary system for providing an urgent warning, according to an exemplary illustration.

Turning now to FIGS. 1 and 3, an exemplary vehicle 100 and associated alert system are illustrated. The vehicle 100 may generally include, without limitation, any motorized vehicle including watercraft. Vehicle 100 may be powered by an internal combustion engine, electrical motor, fuel cell, or any other engine for providing motive force to the vehicle 100. As will be described further below, exemplary visual warnings may be especially beneficial in applications where vehicle 100 does not exhibit significant outward telltale signs that the vehicle 100 is running or otherwise active, e.g., hybrid or electric vehicles, or vehicles that are otherwise relatively quiet and free of vibrations during operation.

Referring now to FIG. 1, vehicle 100 may include at least one closure 102, e.g., a door, for permitting ingress and egress to the vehicle 100 by a driver and/or a passenger. The vehicle 100 may further include a motor 104. As described above the motor 104 may include any motor capable of providing motive force to the vehicle 100 and it may located forward, center, or in the rear of the vehicle. Merely by way of example, the motor 104 may include an internal combustion engine, an electrical motor, a fuel cell, or any combination thereof. In some exemplary approaches, the vehicle 100 includes a hybrid powertrain that includes multiple types of motors 104 in the vehicle 100. The vehicle 100 may also have one or more proximity sensors 120 for detecting a presence of pedestrians or other foreign objects within a perimeter 106 of the vehicle 100. The vehicle 100 may include a processor 122 or other computing device and/or system.

Referring now to FIG. 3, an exemplary system may include vehicle 100 and one or more communication systems, networks, and devices 108, 110, 112, 114, 116, and 117 which allow interaction with the vehicle 100. The communication methods via the devices 108, 112, 114, 116 may, in particular, allow at least some control of illumination and/or warning strategies associated with the vehicle 100. For example, as shown in FIG. 3, a key fob 108 may be provided which allows a user to lock and/or unlock doors of the vehicle, activate and deactivate alarm systems of the vehicle 100, etc. The key fob 108 may also allow a user to deactivate urgent illumination warnings, for example.

Additionally, a cellular or wireless communication network 110 and a vendor-specific radio frequency wi-fi or cellular service 112 may be in communication with the vehicle 100. The wireless communication network 110 and vendor-specific service 112 may facilitate interaction with the urgent illumination warning system of the vehicle 100. For example, a user may interact with the urgent illumination warning system via a text message 116 and or an e-mail 114, e.g., sent by a computing device 117. In some exemplary illustrations, as will be described further below, a user may activate/deactivate an illumination warning system of the vehicle 100 using any communication device, such as the key fob 108, the computer 117 by sending an e-mail 114, and a mobile phone, smartphone, or tablet 117 via text 116. Moreover, a user may acknowledge warnings, provide approval for a resolution that is determined by the vehicle 100 or an urgent warning condition, or perform any other operation associated with the vehicle 100 that is convenient. A user may also modify an alarm state of the vehicle 100 via any of the devices remote from the vehicle 100, such as key fob 108, computer 117, and/or application 112, merely as examples.

Generally, urgent illumination warnings provided by the vehicle 100 are contemplated to include visual warnings that provide an alert or alarm to a vehicle operator, passengers, or bystanders. Accordingly, exemplary illumination warnings may generally be differentiated from notifications or signals typically associated with normal vehicle operation. In some examples, exemplary illumination warnings may be provided by lighting devices which are employed for other purposes during normal operation of the vehicle 100, e.g., exterior turn signals, interior lights, headlights, etc. In such examples, an illumination of the lighting device(s) associated with an urgent warning may be different from an illumination of the device(s) as part of the normal operation of the vehicle 100. For example, urgent illumination warnings may be differentiated from the normal operation illumination such that there is a perceptible difference in at least one of a brightness, a color, and a pattern of the visible nuisance compared with the group of normal vehicle notifications.

In some exemplary illustrations, the visual warnings may rise to a level of a nuisance to a vehicle operator, occupants, or bystanders, and may thus be differentiated from the normal illumination associated with the vehicle 100 on that basis as well. For example, a very rapid, irregular, bright, or otherwise intrusive flashing of vehicle lighting devices that is atypical of normal vehicle operation may serve to warn bystanders, occupants or a vehicle operator of a dangerous condition. Such indicators may need to follow regulatory restrictions, by country, state, or municipalities on the color, brightness, and vehicle operation mode in which these methods can be utilized. For example, there are existing Federal Motor Vehicle Safety Standards (FMVSS) restrictions on the use of white light facing rearward with respect to a vehicle, or light patterns that can be mistaken for emergency vehicles. In some exemplary approaches, urgent illumination warnings are provided around an exterior of the vehicle such that they may be perceived readily by bystanders, pedestrians, or others not inside the vehicle 100. In other examples, illumination warnings may be provided to the interior of the vehicle 100 where an urgent warning to a vehicle operator or occupants of the vehicle 100 is desired. Moreover, internal and external urgent warning notifications need not be exclusive. In fact, in some cases multiple lighting devices may be activated to provide an urgent illumination warning.

Use of vehicle illumination in a manner significantly different from normal usage, or in a manner otherwise intended to catch the attention of the operator and those nearby who may be external to the vehicle may generally improve detection that vehicle state is in an undesired mode. Such signaling could be implemented with the addition of specialized illumination provided specifically for the purpose of providing such urgent warning or it may make use of presently available illumination, e.g., turn signals, headlights, taillights, interior illumination, door lock status LED indicators on the door top trim, etc.

Figure 5A:
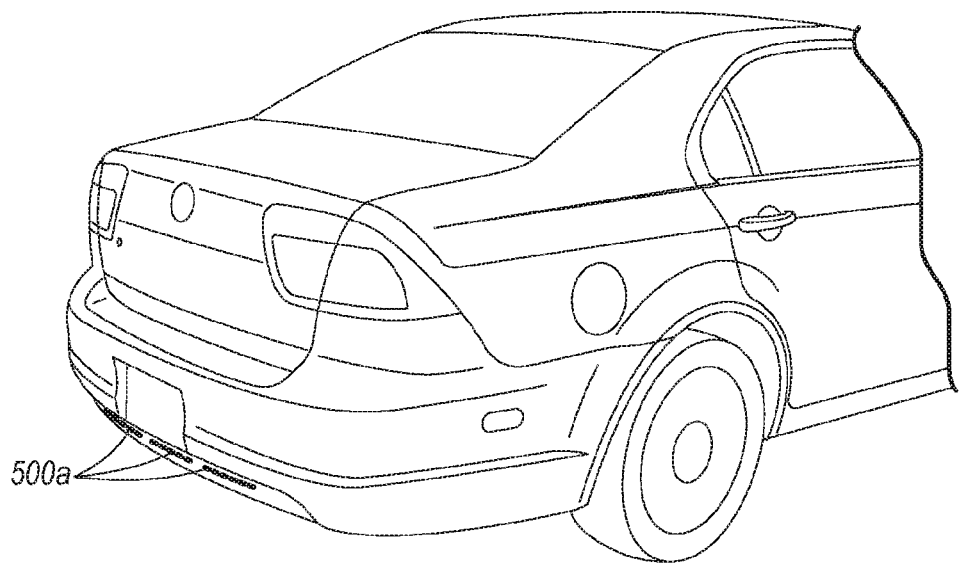
FIGS. 5A-5L illustrate various lighting devices for providing urgent warnings, according to various exemplary approaches.
Figure 5B:
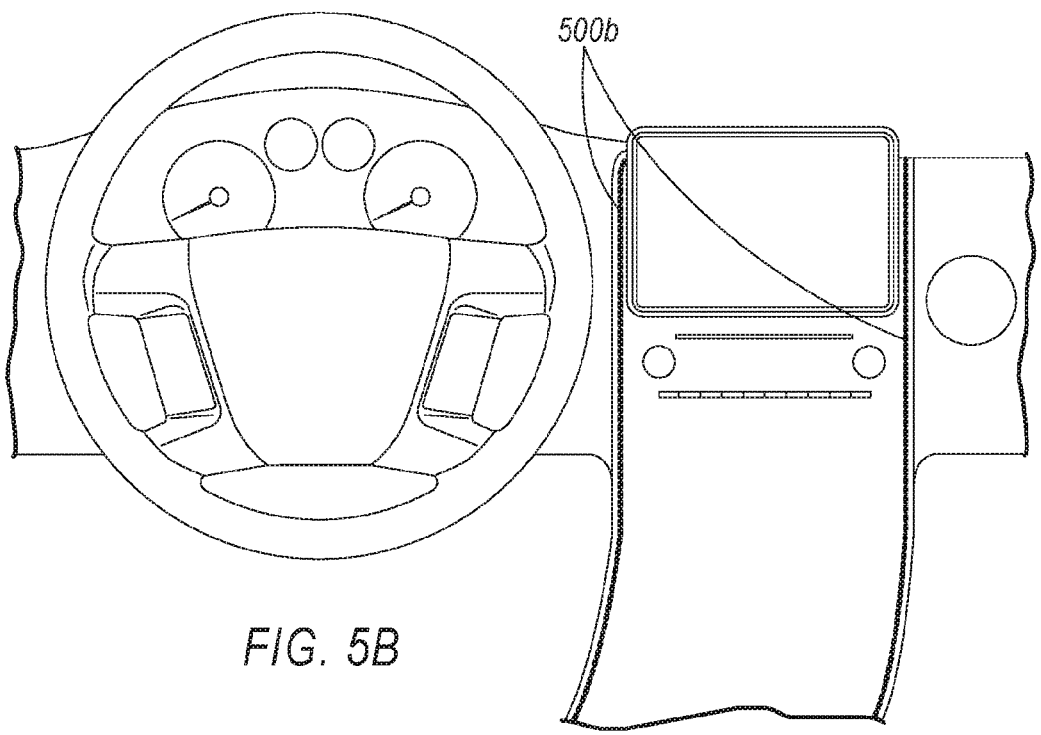
Figure 5C:
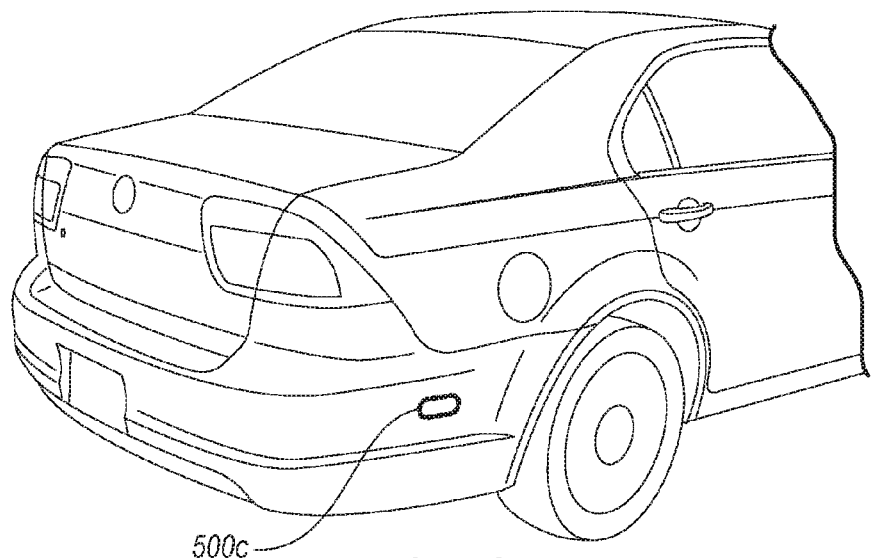
Figure 5D:
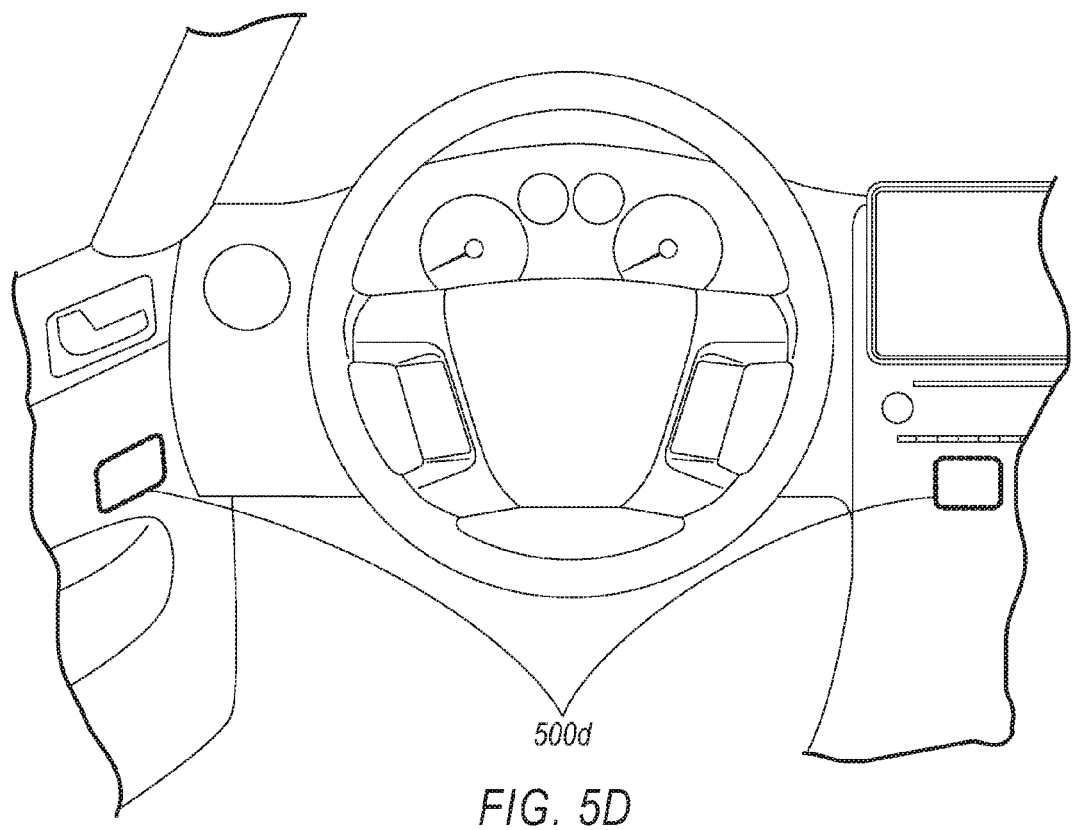
Figure 5E:
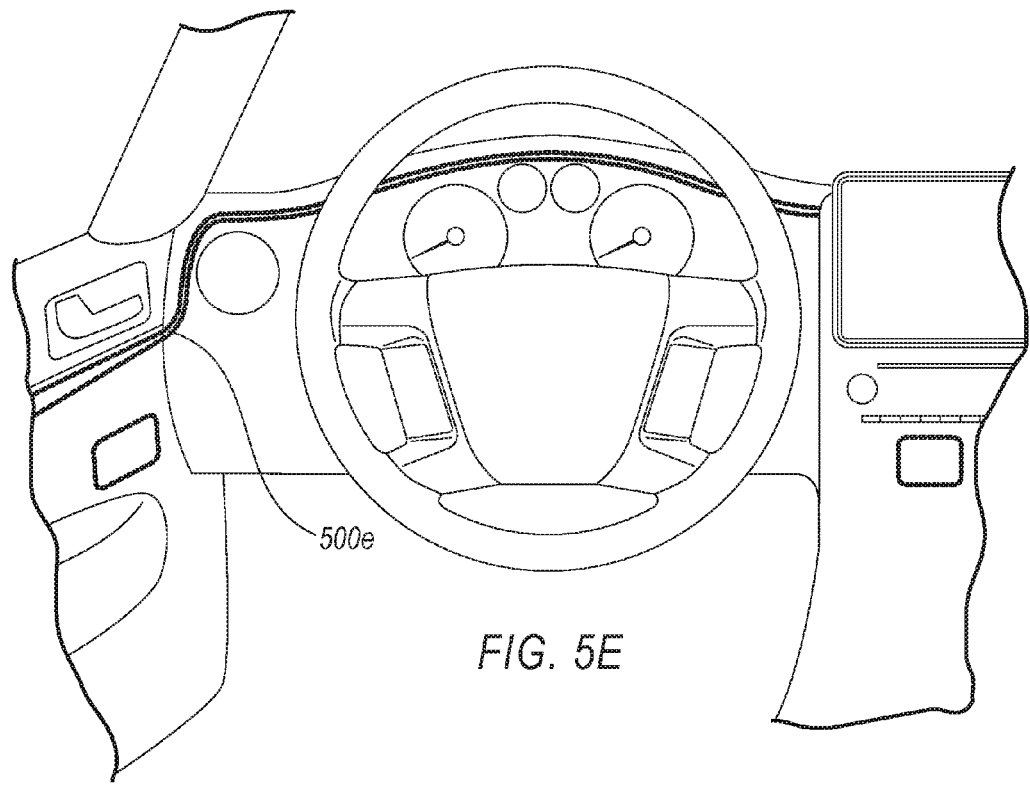

Turning now to FIGS. 5A through 5L, exemplary vehicle lighting devices 500a-500l (collectively, 500) are illustrated that may be used to provide urgent illumination warnings, merely as non-limiting examples. FIG. 5A illustrates exterior lights 500a of the vehicle 100 that are positioned along the rear and/or underbody of the vehicle 100. These lights may be subject to some regulatory restrictions. It may be desirable to only activate these lights if activity is detected in this zone by reverse park aid systems using ultrasonic sensors and/or cameras. FIG. 5B illustrates interior console and door lighting 500b that may be used to provide urgent warnings to occupants of the vehicle 100. FIG. 5C illustrates exterior side lighting 500c of the vehicle which may be activated to provide an urgent warning, e.g., to bystanders or pedestrians nearby vehicle 100. These lights may be subject to some regulatory restrictions. It may be desirable to only activate these lights if activity is detected in this zone by blind spot and/or cross traffic systems using ultrasonic sensors and/or radar. At FIG. 5D, other interior door light and instrumentation panel lighting 500d is illustrated that may be used as part of an urgent warning. Urgent warnings may also be provided via aesthetic lighting 500e in a vehicle interior, e.g., lighting positioned along a dashboard of the vehicle or cupholders, as illustrated in FIG. 5E or the LED locking indicators typically on the top of the door (see FIGS. 6A, 6B) since the LED indicators are typically in the line of sight of a person exiting a door.

Figure 5F:
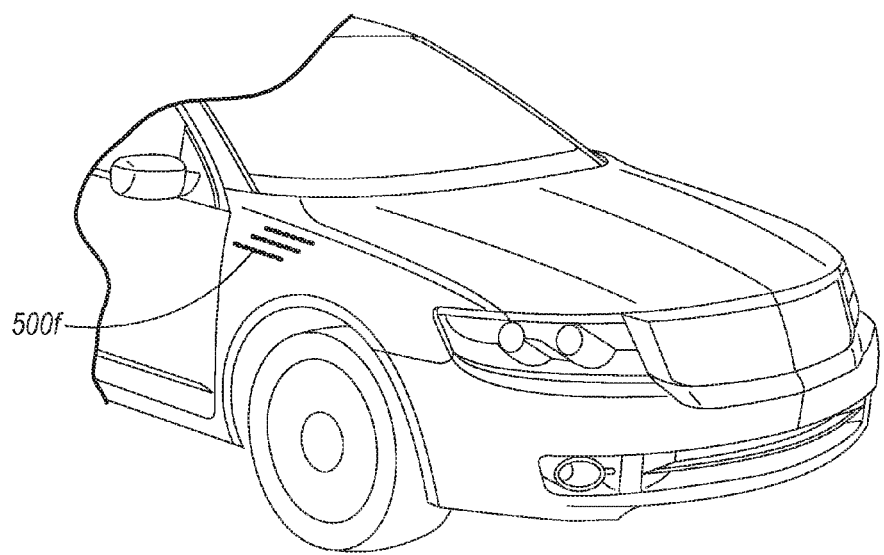
Figure 5G:
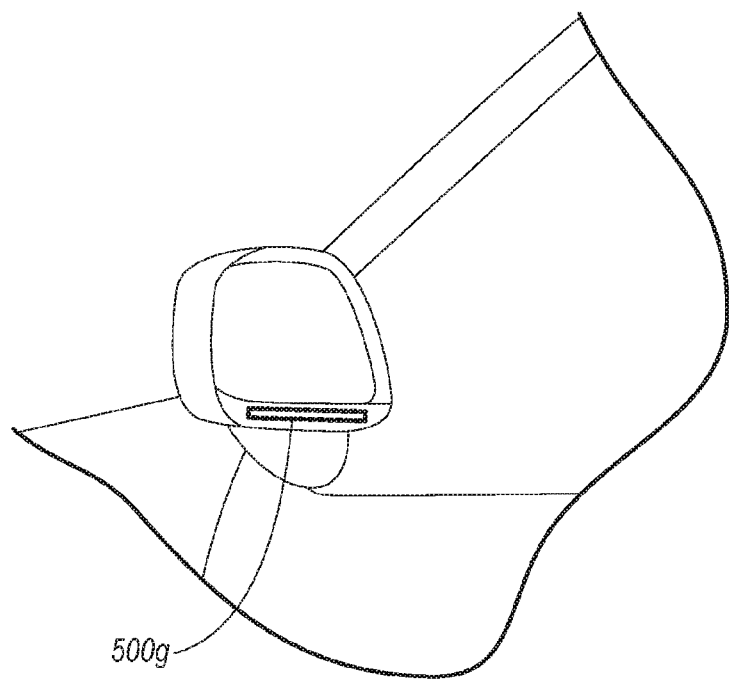
Figure 5H:
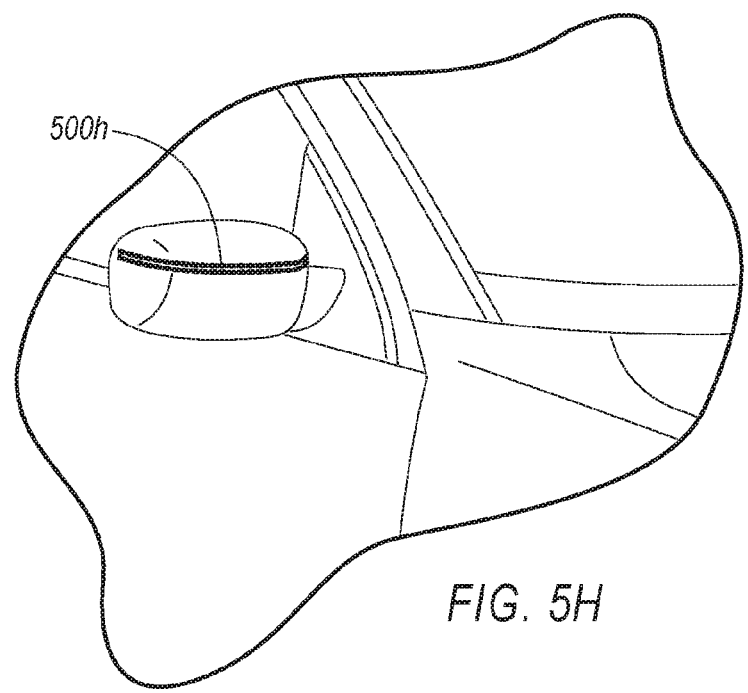
Figure 5I:
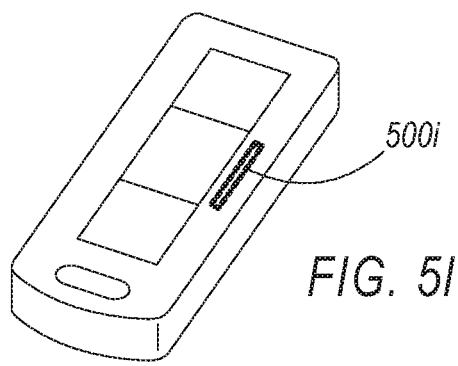
Figure 5J:
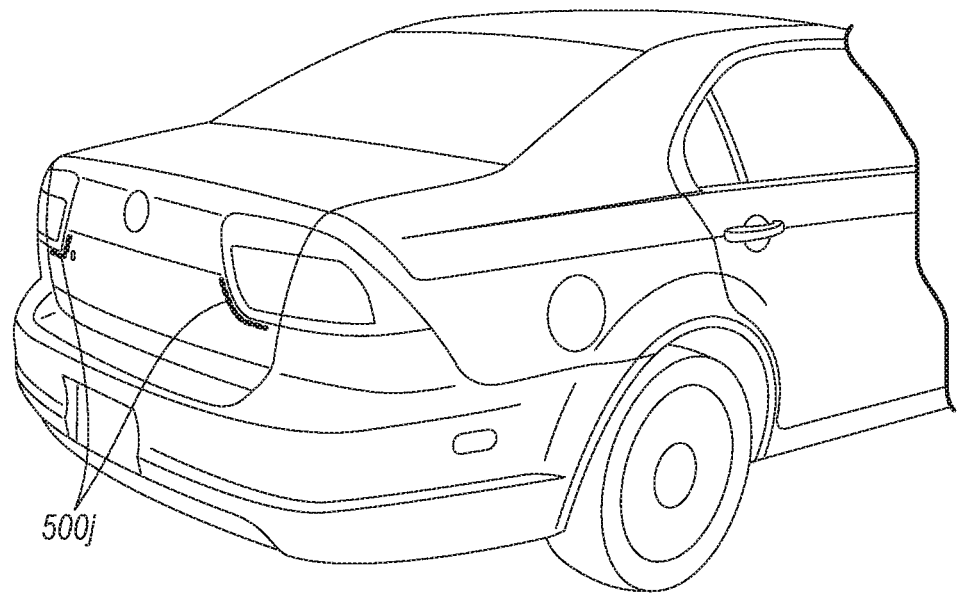
Figure 5K:
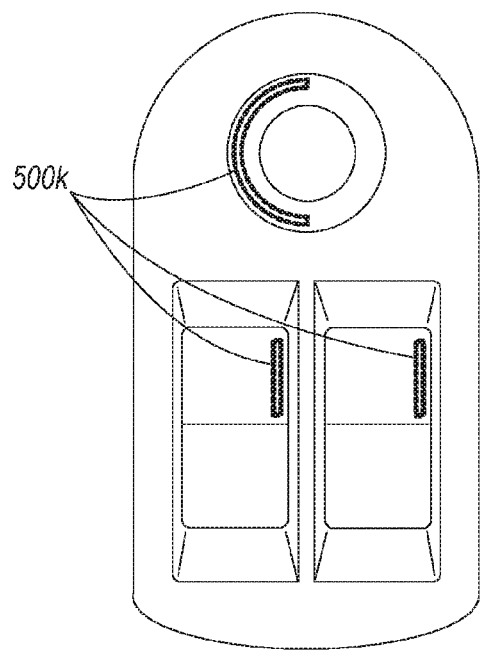
Figure 5L:
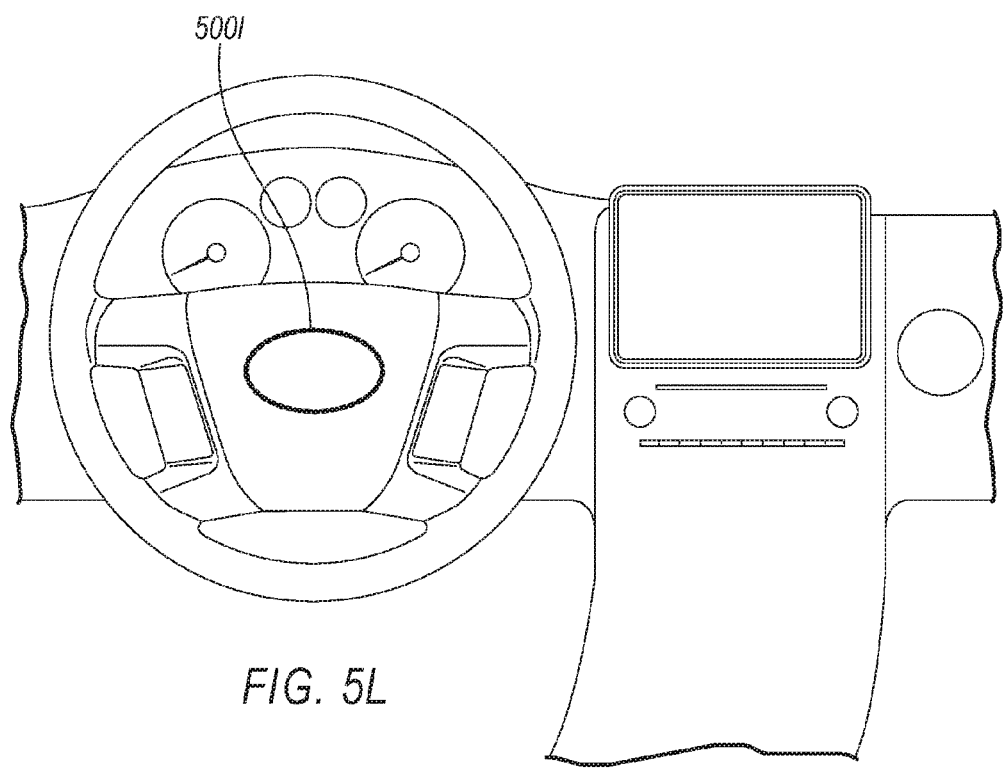

FIGS. 5F, 5G, and 5H each illustrate exterior lighting of the vehicle that may be used to provide an urgent warning. Again, these lights may be subject to some regulatory restrictions particularly non-red light projected rearward or flash patterns that can be mistaken for emergency vehicles or hazard lights. For example, FIG. 5F illustrates exterior side lighting 500f along a body panel of the vehicle, while FIGS. 5G and 5H illustrate LED lights 500g, 500h positioned along rear and front surfaces, respectively, of an outside rearview mirror of the vehicle 100. It may be desirable to only activate the lights of FIG. 5H only if activity is detected in front of the vehicle by lane departure system cameras or radar used for crash mitigation and other safety systems. FIG. 5J illustrates lighting positioned along a rear closure panel of the vehicle 100, while FIG. 5I illustrates lighting 500i positioned along a key fob, e.g., key fob 108, associated with the vehicle 100, and FIG. 5K illustrates lights 500k on interior switches of the vehicle 100. Again, lights as shown in FIG. 5J may be subject to some regulatory restrictions. Urgent illumination warnings may also be provided via other interior lighting, e.g., lighting 500l that is integrated into a vehicle steering wheel and/or an emblem provided on a steering wheel, as shown in FIG. 5L.

Figure 6A:
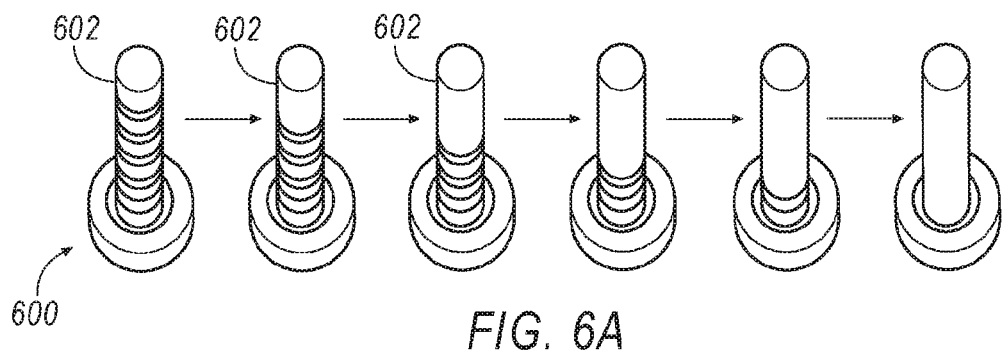
FIGS. 6A-6C illustrate additional exemplary lighting devices for providing urgent warnings.
Figure 6B:
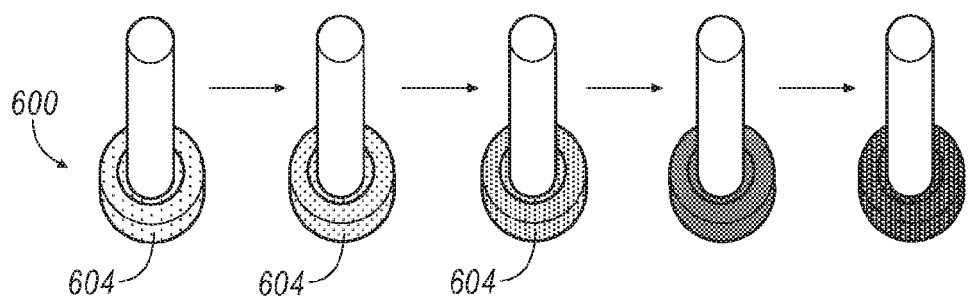
Figure 6C:
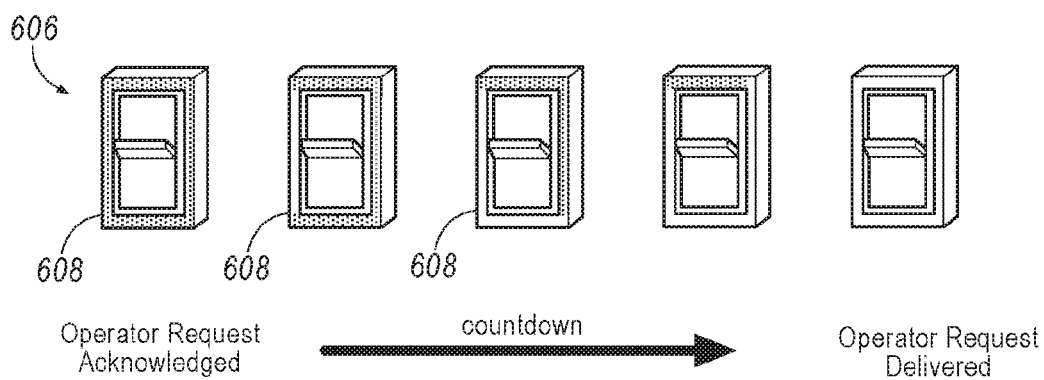

Turning now to FIGS. 6A-6C, existing lighting positions adjacent doors 102 of the vehicle 100 may lend themselves to providing effective urgent illumination warnings. For example, a lock knob 600 that includes one or more LED lights that is positioned along a top of the door sill to indicate locking status or activation of a vehicle alarm to outside passerby may lend itself well to providing urgent illumination warnings. Such LED lighting positioned along the top of the door sill may provide an effective visual alarm to indicate if that the vehicle is still in a motive, active state, e.g., when the user appears to be exiting the vehicle. For example, the vehicle 100 could blink the LED at a fast rate or even use a multi-color LED which changes colors based on the degree of caution that should be communicated. Alternatively or in addition, a series or multiple lights may be used, as discussed below. The lock knob 600 is generally in an advantageous position to be seen as a vehicle occupant swivels out of the seat to exit the vehicle. Additionally, the LED is designed for both night and day visibility for the function of lock state indication.

In some examples, a modified version of the above-described LED locking soldier may be employed. For example, a bar-type or elongated LED that would provide a larger visible surface and could also employ unique patterns such as a linear sweep sequence of LEDs to convey more urgency may be employed. Urgent illumination warnings may be provided in a sequential or relational manner, for example to provide varying levels of warnings. For example, as shown in FIG. 6A, a lock knob 600 associated with vehicle 100 may provide multiple lights along a stick portion 602 of the knob, in order to provide increasing levels of urgency in an urgent illumination warning. Alternatively or in addition, the lights along the stick portion 602 may be flashed sequentially to provide movement that may be more readily perceived by a user of the vehicle 100 and/or bystander. As shown in FIG. 6B, a knob 600 may, alternatively or in addition to the lighting along the stick portion 602, include a trim ring 604, which turns varying shades of color to provide varying levels of warning or different alerts. In another exemplary approach shown in FIG. 6C, a locking switch 606 associated with the locking knob 600 may provide varying levels or movement of light around a perimeter 608 of the switch 606. Additionally, the locking switch 606 may provide an indication of system status via the different lights. Merely as one example, as shown in FIG. 6C, the perimeter 608 of the locking switch 606 may transition between having a portion of the perimeter 608 lit and having the entire perimeter 608 lighted, thereby indicating a transition between acknowledgment of an operator request and delivery of the operator request. Accordingly, urgent visual warnings may be provided in a manner that is more easily perceived, e.g., by illustrating movement. Accordingly, urgent illumination warnings may be made more effective to the extent they are more intrusive or otherwise grab attention of vehicle occupants or pedestrians outside the vehicle 100.

Alternatively or in addition to the lock knob 600 described above, a vehicle 100 may have a Blind Spot Information System (BSIS) configured to alert a vehicle operator of the presence of a vehicle or other object in a blind spot of the vehicle 100, e.g., by flashing an LED light positioned in an outside rear view mirror. The LED in the mirror could also be flashed to indicate an urgent illumination warning, e.g., when the vehicle door is opened. In still other exemplary approaches, other vehicle lighting may be provided to indicate an urgent illumination warning. Merely as examples, special lighting patterns on external illumination currently utilized to provide turn signaling for the vehicle 100, special lighting patterns on running lights headlights, tail lights, fog lights ground lighting, door handle lighting of vehicle 100 may be used to alert passerby or pedestrians on the outside of the vehicle 100. Additionally, special lighting patterns on interior lighting, cluster lighting, map lighting, dome lighting, or other available sources of illumination in the interior of the vehicle 100 may be used to alert occupants of the vehicle 100 of an urgent illumination warning.

Side mirror-mounted signaling may also be utilized in a manner similar to hazard lighting, whereby it flashes in manner to draw attention that vehicle status ought to be checked. For example, a pattern of flashing either identical to hazard lighting or distinctly different from that and that of turn signaling may be employed. Additionally, alternate light colors may be utilized, and/or individual bulbs can be utilized in unique patterns or timing.

In another example, activation of external lights may be executed in a manner that rotates around the car or in another pattern designed to quickly signal an urgent warning that a status of the vehicle 100 might be in an undesired mode. Similarly, such an approach might be performed or involve use of interior lighting and unique colors or patterns designed to provide quickly visible indication to both external and internal persons that vehicle, electrical usage, powertrain, or engine may remain enabled, key may be left in the ignition, vehicle usage may remain authorized, accessory mode active, etc.

In some exemplary approaches, lighting used to provide urgent warnings may be existing lighting used for other purposes associated with the vehicle 100. For example, as seen above in FIGS. 5A-5K, and 6A-6C, lighting may be provided around lighting devices of a vehicle that have other purposes, e.g., exterior turn signals, in order to provide urgent warnings. In other exemplary approaches, dedicated lighting may be provided, whose sole purpose is to provide lighting as part of urgent warnings. In still other exemplary approaches, a combination of dedicated and other vehicle lighting may be used to provide urgent warnings.

Figure 2:
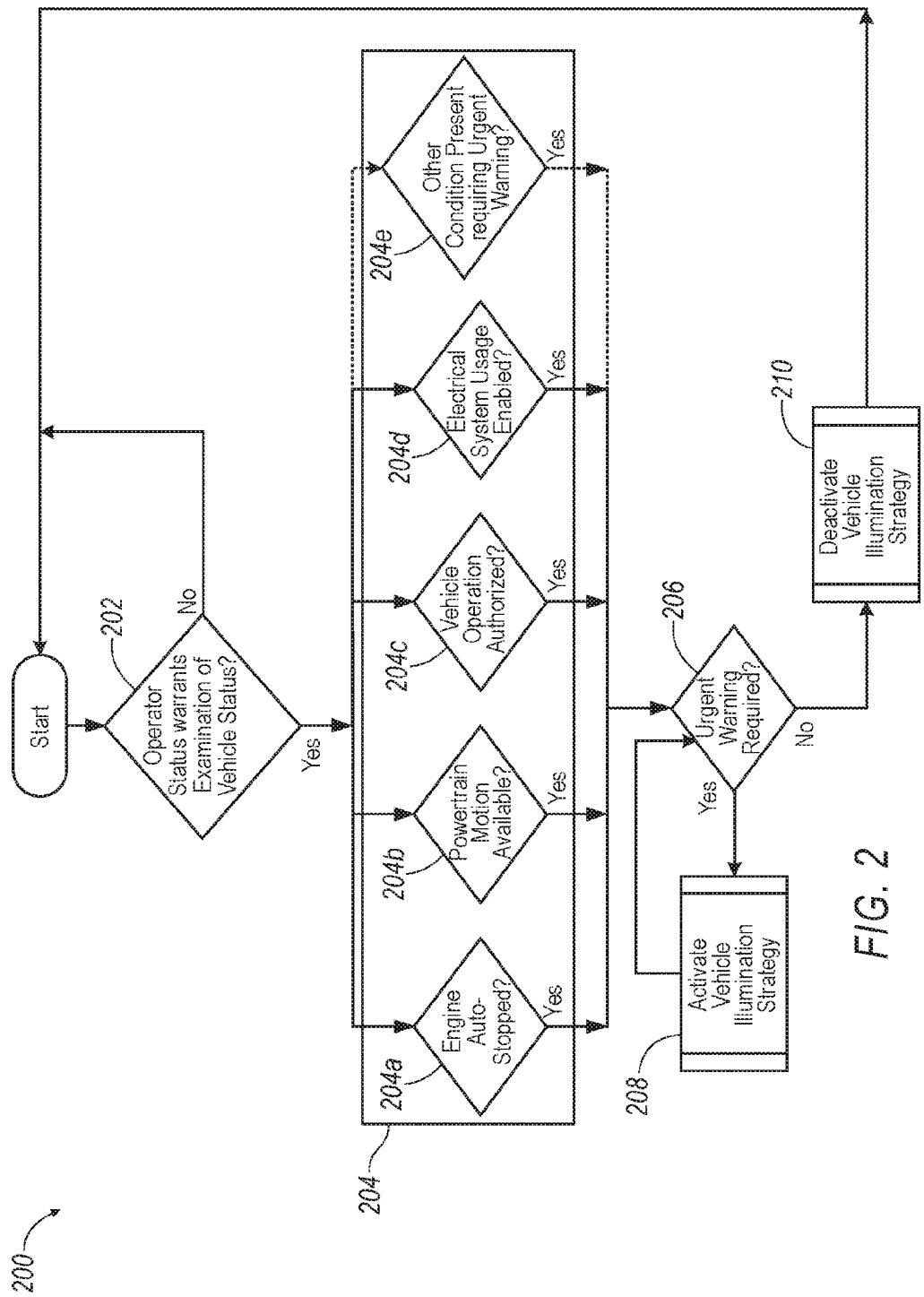
FIG. 2 is an exemplary process flow diagram for a method of providing an urgent warning, according to one exemplary approach.

Turning now to FIG. 2, an exemplary process 200 of providing a vehicle illumination warning is illustrated. Process 200 may begin at block 202, where process 200 queries whether an operator status warrants examination of a vehicle status. Criteria that may be used to determine whether an operator status warrants examination of the vehicle status may include, but is not limited to, determining whether a door 102 of the vehicle 100 is open, whether a seatbelt associated with vehicle 100 is unbuckled, whether other closures of the vehicle 100, e.g., a hood or trunk are open, and whether a pedestrian or other object is detected by the proximity sensors within a predetermined field of view (e.g., perimeter 106) of the vehicle 100, as may be convenient. If the operator status does not warrant examination of the vehicle status, process 200 may proceed to block 206. If the operator status does warrant examination of the vehicle status, process 200 may proceed to block 204.

At block 204, the vehicle status may be examined. Block 204 may thus generally determine whether the vehicle 100 poses a potential danger to pedestrians, operators, or other people near the vehicle 100. Any number of factors may be selected for use in block 204 in analyzing the status of the vehicle. For example, as illustrated in FIG. 2, block 204 may comprise blocks 204a, 204b, 204c, 204d, and 204e, which include exemplary factors to consider. More specifically, process 200 may query whether an engine associated with the vehicle is auto-stopped (204a), whether powertrain motion is available (204b), whether vehicle operation is authorized (204c), whether electrical system usage is enabled (204d), or whether any other conditions are present that would necessitate an urgent warning (204e). Other factors may be used as alternatives, or in addition to blocks 204a, 204b, 204c, 204d, 204e (collectively, 204).

Proceeding to block 206, process 200 may query whether an urgent warning is required. In some examples, process 200 may determine whether an urgent warning is required in view of the particular operator status determined at block 202 and the vehicle status determined at block 204. For example, the vehicle status may be analyzed in view of the particular factors used to determine that the operator status warrants examination of the vehicle status. If in block 202 it is determined that the hood is open, relevant vehicle status factors to determine whether an urgent illumination warning is appropriate may include any vehicle factors that would likely pose a danger to someone who is examining vehicle 100 under the hood, e.g., performing service to the vehicle 100. Conversely, this logic may apply to the deck lid in vehicles where the engine is located in the rear of the vehicle. Thus, particularly relevant factors to be considered at block 204 may include whether electrical power is enabled within the vehicle 100, and whether powertrain motion of the vehicle 100 is enabled in any way. In another example, if all doors 102 and the hood of the vehicle 100 are closed, and powertrain motion is available, and an operator is detected sitting in the driver seat of the vehicle 100, it would appear likely the vehicle is in normal operation. Accordingly, in such instances, vehicle 100 may only provide an urgent warning if certain factors are detected relevant to the determination that the vehicle 100 appears to be in normal operation. For example, an urgent warning may in this case only be provided if a pedestrian or other object is detected within a perimeter 106 of the vehicle 100, or a collision or contact with the pedestrian or object is determined to be possible. Thus, in this particular exemplary approach, process 200 may determine that an urgent warning is not required unless a vehicle factor(s) determined in block 204 are relevant to the particular operator status(es) determined at block 202. Further, it may be advantageous that as a default, the urgent warning indicators are always activated post-crash (air bag deployment) or fuel line inertia sensor trigger if the vehicle remains in an ignition active state.

If no urgent illumination warning is necessary as determined at block 206, process 200 may then proceed to block 210, where the vehicle illumination strategy for urgent warnings is deactivated. Alternatively, if at block 206 an urgent warning is required, process 200 may proceed to block 208, where the urgent illumination warning strategy is activated. Process 200 may then proceed from block 208 back to block 206, such that the vehicle 100 generally continuously determines whether an urgent warning is required until such time that an urgent warning is no longer required then the process 200 proceeds to block 210. Similarly, from block 210, process 200 may proceed back to the start, such that the vehicle 100 generally continuously re-examines the operator status and vehicle status in order to determine whether an urgent warning is required.

Figure 4:
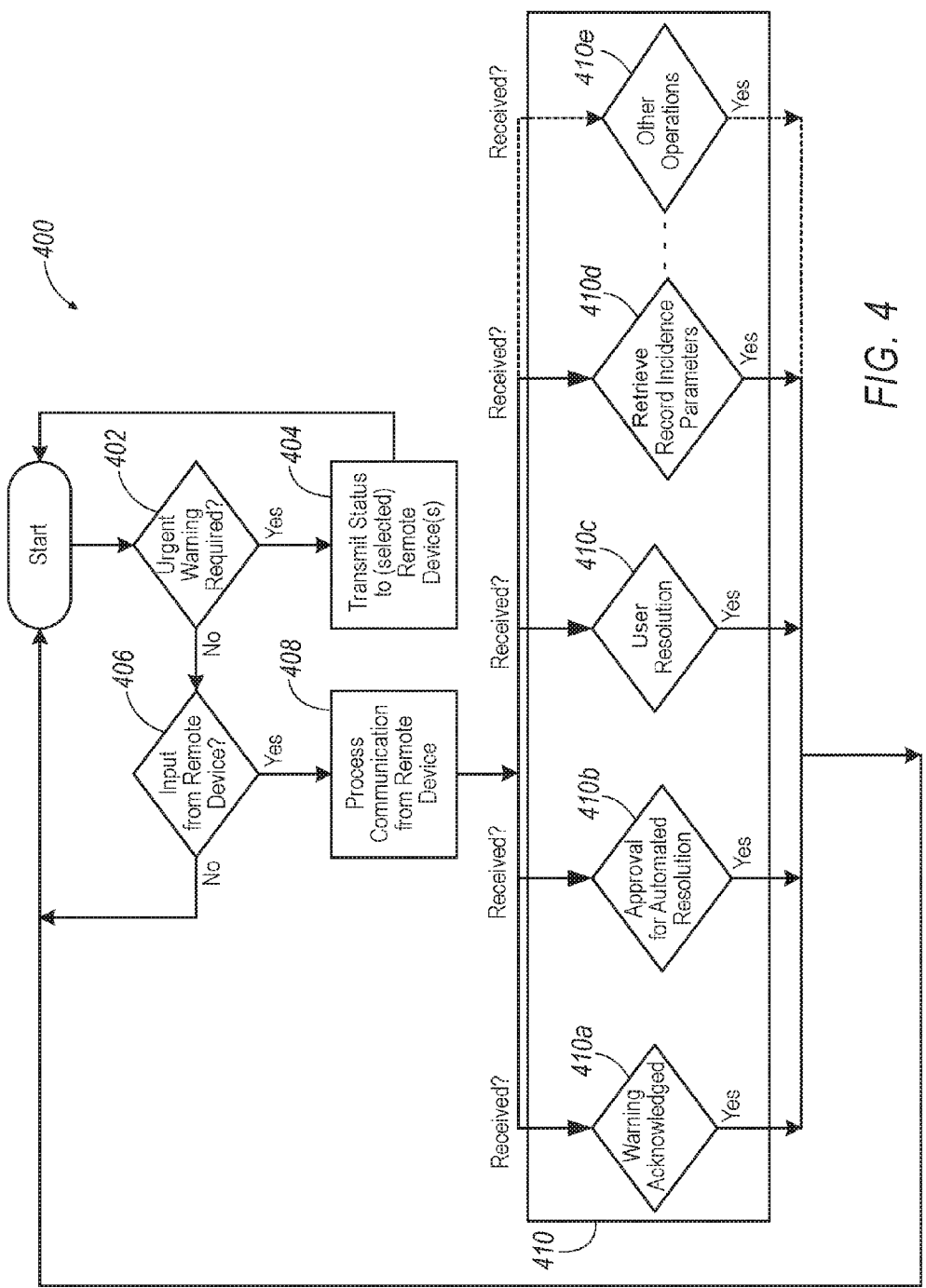
FIG. 4 is an exemplary process flow diagram for a method of providing an urgent warning via a mobile device, according to one exemplary approach.

Turning now to FIG. 4, an exemplary process 400 for employing one or more mobile devices in conjunction with vehicle 100 is illustrated. For example, as noted above in FIG. 3, vehicle 100 may be in communication with the key fob 108, a mobile phone via cellular or wireless communication network 110, computing devices via e-mail 114, and/or mobile communication devices (e.g., mobile phones, smart phones or tablets) in conjunction with a vendor-specific cellular service 112.

Process 400 may begin at block 402, where it is determined whether an urgent warning is required. For example, whether an urgent warning is needed may be determine in the same manner described above in regard to FIG. 2 and in particular, block 206 thereof. If an urgent warning is required, process 400 may proceed to block 404. Alternatively, process 400 may proceed to block 406 if an urgent warning is not required. In addition to any lighting device(s) illuminated as part of an urgent illumination warning strategy, a status of the vehicle 100 and/or the urgent warning system may be transmitted to one or more user-selected mobile devices. For example, a user may receive a notification on a mobile device, e.g., a smart phone or tablet, or on key fob 108, or any other device selected by the user. Exemplary notifications may alert the user to the activation of an urgent warning, for example.

At block 406, process 400 may query whether an input has been received from the one or more user-selected remote devices. For example, a user may confirm receipt of an urgent warning notification, or may otherwise provide inputs to the vehicle 100. In some exemplary approaches, a user may deactivate the urgent warning, e.g., upon independently confirming that the vehicle 100 is secured, a pedestrian has moved away from the vehicle after setting off the urgent warning, or the vehicle 100 otherwise does not pose a danger. If an input from the remote device has been received, process 400 may proceed to block 408 where the communication from the remote device is processed.

Proceeding to block 410, any communication received from the remote device may be acted upon. Accordingly, an alarm state associated with a vehicle may be modified by transmitting a command or signal from a device that is remote from the vehicle, e.g., key fob 108, computing device 117. Any variety of communications from the remote device (s) may be enacted at block 410. Exemplary illustrations of communications that may be sent/received may include, but are not limited to, a user acknowledgement of a warning (block 410*a*), or a user approval for an automated resolution of the urgent warning (block 410*b*, e.g., automatic deactivation after the detected vehicle or occupant condition which triggered the urgent warning has ceased). Moreover, a user may provide a resolution (block 410*c*), e.g., by deactivating the vehicle or system thereof. Additionally, a user may also retrieve a record of urgent warnings triggered by the vehicle 100 (block 410*d*). Any other operations that may be convenient may be undertaken by a user via one of the remote device(s) (block 410*e*). In another exemplary illustration, a user may adjust parameters associated with the urgent warning system.

Process 400 may then proceed back to block 402 in a loop. Accordingly, process 400 generally allows vehicle 100 to continuously determine whether an urgent warning is required and whether inputs from a remote device relevant to the urgent warning had been received.

As a general rule, it may be preferred that a vehicle which has been remote started, or remotely activated for pre-conditioning, should not activate the urgent warning system since remote start/pre-conditioning is typically executed in a non-motive mode which does not allow vehicle motion. For example, typically vehicle motion will not be allowed until there has been a valid read of a valid key by the immobilization system, the only typical exception to this rule being if the engine compartment hood or deck lid (depending on engine location) was opened while in an active remote start/preconditioning mode.

In some exemplary approaches, the exemplary methods described herein may employ a computer or a computer readable storage medium implementing the various methods and processes described herein, e.g., processes 200 and/or 400. In general, computing systems and/or devices, e.g., a processor of the vehicle 100, key fob 108, or any remote or mobile device described herein, merely as examples, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," etc. should be read to recite one or more of the indicated elements unless a claim recites an explicit limitation to the contrary.

What is claimed, is:

1. A method, comprising:
   operating a plurality of visible lighting devices, disposed on an exterior of a vehicle, in a first operating state;
   activating an alarm state in response to a vehicle operator exiting the vehicle while a vehicle powertrain is in a mode allowing vehicle motion; and
   changing operation of the visible lighting devices to a second operating state that is different than the first operating state for signaling an alarm notification in response to the alarm state.

2. The method of claim 1, further comprising flashing the visible lighting devices in a sequential pattern while the visible lighting devices are in the second operating state.

3. The method of claim 1, wherein operating in the second operating state includes providing a perceptible difference in at least one of a brightness, a color, and a pattern of the visible lighting devices compared with operation during the first operating state.

4. The method of claim 1, wherein the visible lighting devices include at least one of a light emitting diode (LED), an exterior vehicle light, and an interior vehicle light.

5. The method of claim 1, wherein the visible lighting devices are located on the vehicle such that the visible lighting devices are visible from an exterior of the vehicle.

6. The method of claim 1, wherein the vehicle powertrain is in an enabled mode that is associated with a run condition of the vehicle.

7. The method of claim 1, further comprising setting respectively, activating and deactivating the alarm state in response to corresponding commands transmitted from a device remote from the vehicle.

8. The method of claim 1 further comprising detecting a level of urgency associated with the alarm state, wherein a number of visible lighting devices illuminated increases as the level of urgency increases.

9. The method of claim 1 wherein the visible lighting devices are operated while the visible lighting devices are in the second operating state in a sequential pattern in which light appears to rotate around the vehicle.

10. A method, comprising:
    operating a plurality of visible lighting devices to output a notification selected from a plurality of vehicle notifications during operation of a vehicle;
    activating an alarm state in response to a closure of the vehicle being open while a vehicle powertrain is in a mode allowing vehicle motion; and
    outputting an alarm notification by operating the visible lighting devices to illuminate in a sequential pattern that creates light movement across the lighting devices in response to the alarm state, including outputting the alarm notification such that it is visible from an exterior of the vehicle.

11. The method of claim 10, wherein the vehicle powertrain is in an enabled mode that is associated with a run condition of the vehicle.

12. A vehicle, comprising:
    a plurality of lighting devices disposed on an exterior of the vehicle; and
    a processor programmed to operate the lighting devices in a first state and, in response to receiving inputs indicative of a closure of the vehicle being open while a vehicle powertrain is in a mode allowing vehicle motion, operate the lighting devices in a second state that is different than the first state for signaling an alarm notification.

13. The vehicle of claim 12, wherein the processor is configured to flash the lighting devices in a sequential pattern in response to operating the lighting devices in the second state.

14. The vehicle of claim 12, wherein the lighting devices include at least one of a light emitting diode (LED), an exterior vehicle light, and an interior vehicle light.

* * * * *